Oct. 18, 1949.    V. E. PRATT ET AL    2,485,411
MICROFILM READING SPECTACLES
Filed Aug. 30, 1945    4 Sheets-Sheet 1
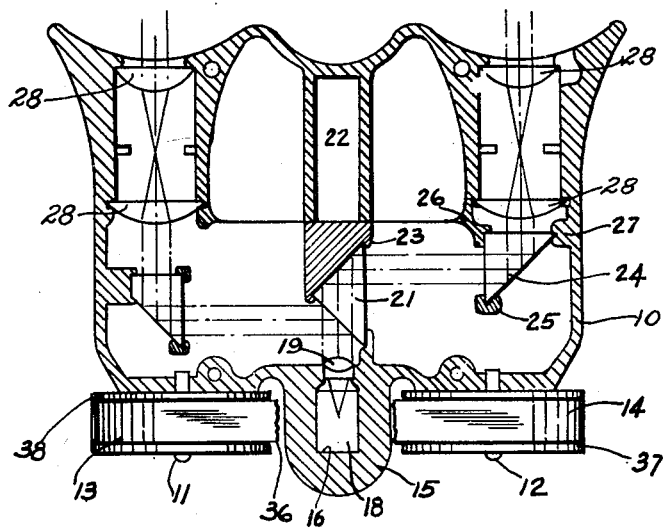
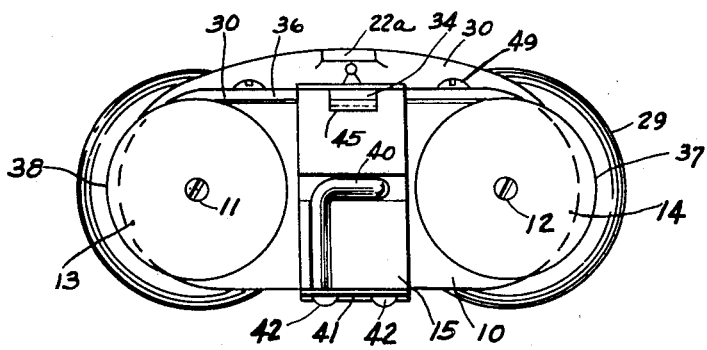
INVENTORS
VERNEUR E. PRATT
GEORGE F. GRAY
BY
Van Deventer + Grier
ATTORNEYS Oct. 18, 1949.  V. E. PRATT ET AL  2,485,411
MICROFILM READING SPECTACLES
Filed Aug. 30, 1945  4 Sheets-Sheet 2
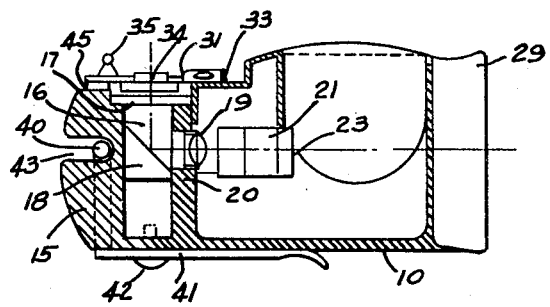
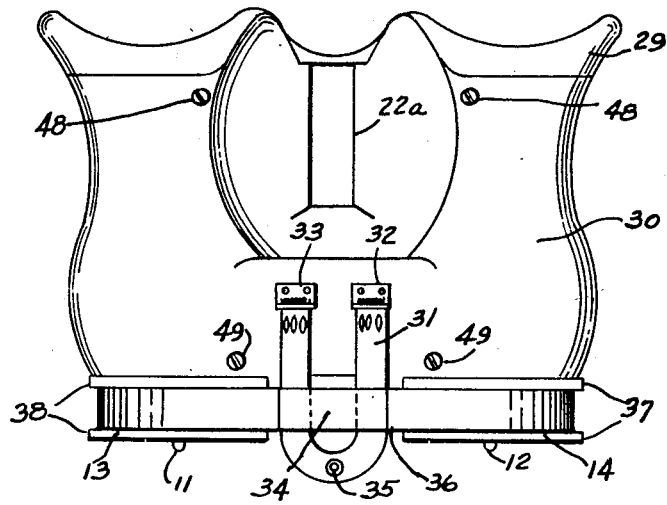
INVENTORS
VERNEUR E. PRATT
GEORGE F. GRAY
BY Van Deventer & Grier
ATTORNEYS INVENTORS
VERNEUR E. PRATT
GEORGE F. GRAY
BY
Van Deventer + Grier
ATTORNEYS Oct. 18, 1949.    V. E. PRATT ET AL    2,485,411
MICROFILM READING SPECTACLES
Filed Aug. 30, 1945    4 Sheets-Sheet 4
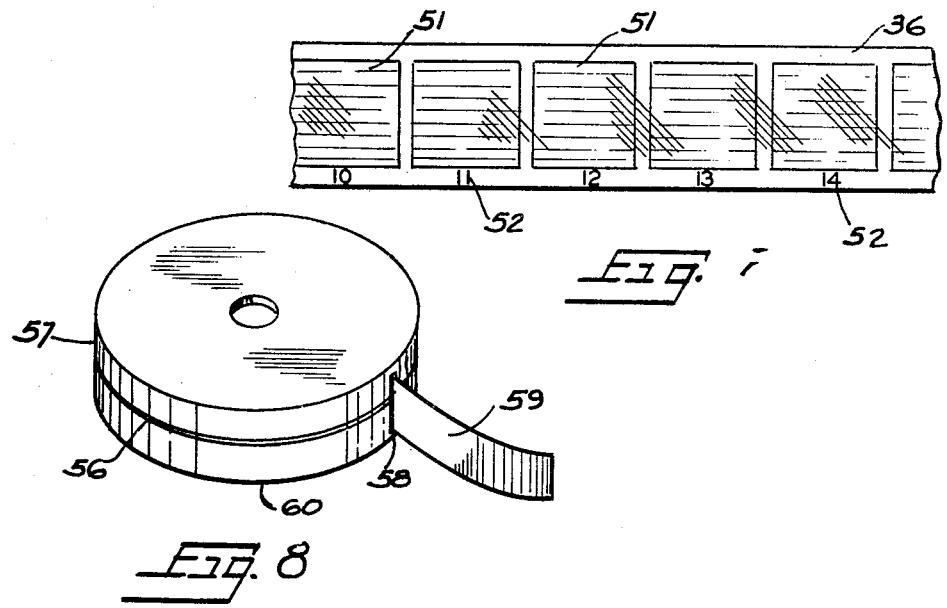
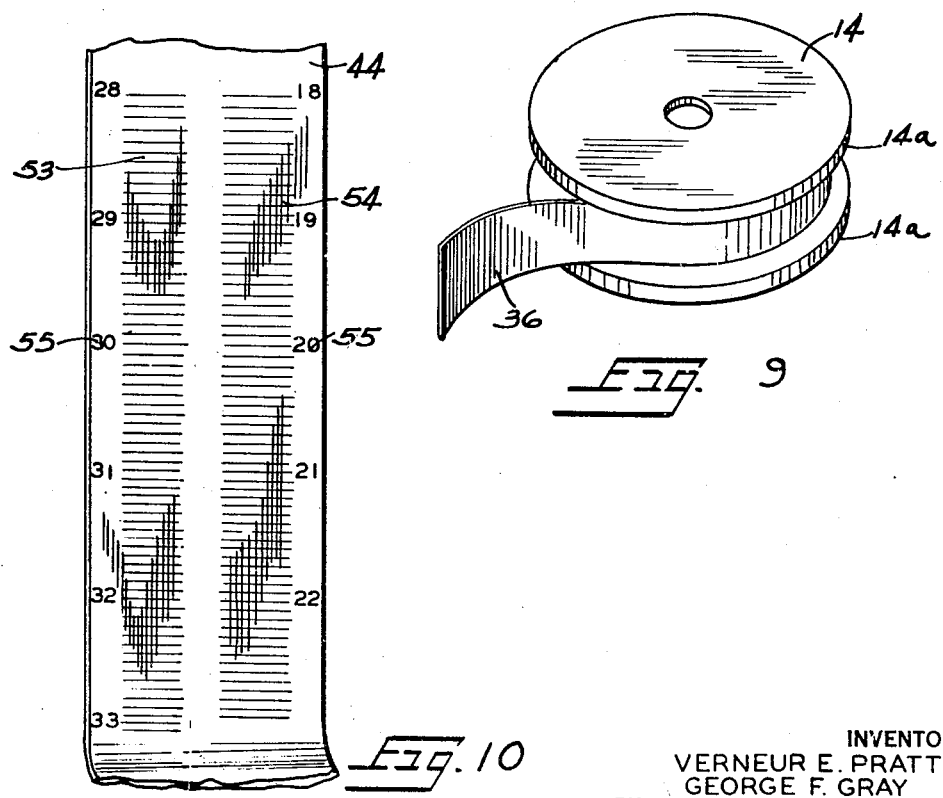
INVENTORS
VERNEUR E. PRATT
GEORGE F. GRAY
BY
Van Deventer & Grier
ATTORNEYS Patented Oct. 18, 1949

2,485,411

UNITED STATES PATENT OFFICE 2,485,411

MICROFILM READING SPECTACLES

Verneur E. Pratt and George F. Gray,
Norwalk, Conn.

Application August 30, 1945, Serial No. 613,647

2 Claims. (Cl. 88—1)

This invention relates to microfilm reading spectacles, and more particularly to binocular viewers for the enlargement and reading of microbooks, or books recorded on narrow strips of microfilm.

Ordinary printed books which usually have a type-page size of 4½ x 6½ inches can be reduced in size at least 30 diameters, resulting in a page size on the microfilm of approximately 3.5 millimeters by 5.5 millimeters.

At this reduction ratio a 250-page book can be recorded in twin rows on less than three feet of 8-millimeter film, by recording the rows of type transversely across the film in two parallel columns.

Using reduction ratios as high as or higher than 30X means the utilization of so little film that it is impractical to use ordinary reading machine projectors for reading the film back to normal size of the original book. In addition, most of the reading machine projectors in use are electrically connected, are bulky and expensive and prohibit the use of microfilm books where there is no electric current.

An object of the present invention is to provide a binocular device which holds tiny cartridges of "microbook" film, one title on each small reel, the reels being as small as one inch by one-quarter inch to hold one 250-page book. This device "reads" the film by simple magnification, rather than by projecting light through it to a screen.

Another object is to so arrange the device that the light source is the sky or any overhead light.

A further object is to provide a device of the character described which can be made of light plastic and weigh but a few ounces. It can be fitted with ordinary spectacle frames which go over the ears, or to a head-band or other means to hold it in front of the eyes.

Another object of the present invention is to furnish a non-electric means of magnifying small strips of narrow width microfilm in such manner that both eyes see the image.

Further objectives of the invention will become apparent from the following specification.

In the accompanying drawings:

Figure 1 is a downward sectional view of a preferred form of the device with the cover removed;

Figure 2 is a front plan view of the device shown in Figure 1 with cover in place;

Figure 3 is a transverse sectional view with cover in place;

Figure 4 is a downward view of the device, Figure 1, with cover in place and with film rolls adapted to feed film transverse the user's line of sight;

Figure 7 is a strip of film showing the recording of ordinary 4½ x 6½ book pages with the lines of type parallel to the length of the film, with the usual page numbers recorded;

Figure 8 is a container with slotted lid and bottom with said slots turned to permit exit of film;

Figure 9 is a reel containing a tiny reel of 7 or 8 mm. film; and

Figure 10 is a strip of film showing two parallel rows of book type images recorded on microfilm without page separation, and with numbers at the side to indicate each hundred lines of type.

Figure 5:
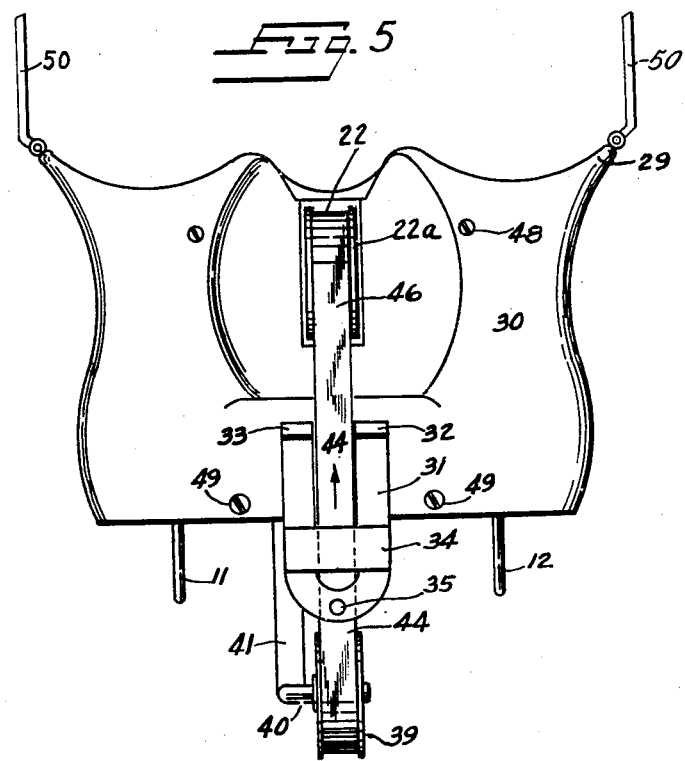
Figure 5 is a downward view of the device, Figure 1, with cover in place with film rolls adapted to feed film parallel to the user's line of sight.

Referring to Figure 1, the numeral 10 denotes the lower casing or housing of the device. This is preferably made of a suitable plastic and forms a chamber having various bosses therein to receive cover screws, lenses and prisms.

Secured in and projecting outwardly from the front end of this casing are the pins 11, 12 for supporting the film reels 13, 14. These pins may be split so that the bore of the reel fits sufficiently tight to prevent the reels from dropping off the pins, or the outer ends of the pins may be threaded and provided with nuts. Any suitable arrangement may be used wherein the reels 13, 14 are revolvably supported on the pins 11, 12.

The head of the casing extends outwardly as shown at 15, and a well 16 is located therein over which is secured a transparent plate 17 forming part of the film gate.

A prism 18 is mounted in the bottom of well 16, and objective lens 19 is mounted in a web or boss 20 in the casing. This web may also support prism 21.

A well 22 adapted to receive one of the film spools is formed in the casing, and the portion 23 of the wall of this well may help support prism 21 as best seen in Figure 3.

A prism 24 is positioned in the casing by bosses 25, 26, 27, and the eyepiece generally denoted by the numeral 28 is held in a suitable tubular bore in the rear ends 29 of the casing forming external eyepieces or flanges.

It will now be seen that an optical path exists between the user's eye at 29 via lenses 28, prism 24, prism 21, lens 19, to prism 18, to transparent plate 17, the upper surface of which is the focal plane of the device.

Light entering the film gate from above and passing through the film illuminates a single field on the film, passes to prism 18, through lens 19 to prism 21, where the beam divides and passes to prism 24 and lenses 28 on each side of the device, so that both eyes see the same image but by binocular vision.

As the optical path for the other eye of the observer is the same as that just described, it is not described in detail.

A cover 30 of plastic covers the open top of the casing 10 and has an aperture 22ª which forms the mouth of the well 22. On the cover is mounted the movable member 31 of the film gate which comprises a U-shaped member secured to the cover by spring hinges 32, 33, and carries a transparent plate 34 which extends down between the legs of the U to overlie the stationary plate 17 of the gate. A handle 35 is secured to the member 31 so that it can be raised upwards against the tension of spring hinges 32, 33 to permit a film to lie between plates 17 and 34, and the tension of the spring hinges is such that the film may be easily traversed through the gate when in place between the plates in the manner presently described.

When reels 13, 14 are positioned on pins 11, 12, the film 36 extends between the reels and moves in a line transverse the optical axes of the lenses 28, and if the film has images thereon as shown in Figure 7, these images can be read by moving one or other of the reels with the tip of the finger, which is applied to the periphery of the reels at 37 or 38. Thus, the film can be moved back and forth through the film gate and will be illuminated from the top through transparent plate 34. The side plates of the reels project at each side of the device as best seen in Figure 4, and are easy to manipulate and may be knurled or roughened to facilitate movement.

Figure 6:
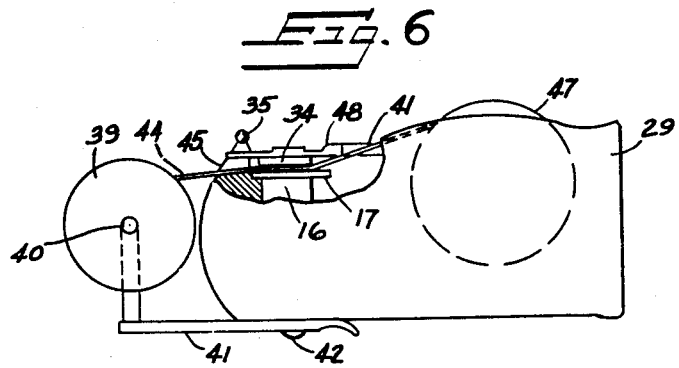
Figure 6 is a side view of the device, Figure 5.

When the images are placed on the film as shown in Figure 10, then the reels are arranged as shown in Figures 5 and 6. Here reel 39 is supported on the pin or film reel support 40 riveted to a slide 41 slidably secured by pins 42 to the underside of casing 10. Normally the slide is in the position shown in Figure 3, and the pin 40 lies within the depression 43 in the head 15. When it is desired to use the pin, slide 41 is pushed outwardly which brings pin 40 to the position shown in Figures 5 and 6 so that reel 39 can be supported thereon.

Film 44 may be threaded from reel 39 through a slot 45 in the upper edge of the front 15, so it will lie between plates 17 and 34 of the film gate. It then passes rearwardly as indicated by the arrow 44, Figure 5, and, as it traverses, is wound on reel 46 which is dropped into well 22 with its upper portion 47 projecting slightly above the cover so it can be easily moved with the finger.

Reels 39 and 46 can be manipulated by the user same as reels 13 and 14 previously described.

The cover 30 of any suitable material (preferably plastic to match the casing 10) is secured to the casing by cement or screws 48, 49, thus completely enclosing the lenses and prisms.

If desired, the lens mount for lenses 28 can be of any known adjustable type so that the device can be focussed by the user, but a fixed-focus is generally satisfactory. The device may be provided with the usual temple pieces 50, so it may be worn by the user like a pair of eyeglasses. Being small and light in weight, it may be worn for long periods without fatigue.

Figure 7 shows the film 36 having a plurality of images 51 thereon, each image being that of a book page, for example, and the lines of type run lengthwise of the film. Such a film is used in the device shown in Figure 4. Here each page or image may be numbered as indicated at 52.

Figure 8 shows another form of reel having a casing 56 and cap 57 having slots 58 which can be brought into registry by rotating the cap on the cover. The film 59 may then be brought out of the slot. When the slots 58 are not in registry, the film is entirely enclosed and protected. The casings 56 and caps 57 may be formed to simulate knurling on their outer faces 60 to facilitate manipulation, as this will provide a rough surface for the user's fingers when turning the reel.

Figure 9 shows one of the reels such as 14. The edges 14ª of the reel may be knurled to facilitate manipulation.

Figure 10 shows the film 44 having two parallel columns 53, 54 thereon running lengthwise of the film with the reading matter across the film. Such a film is used in the device Figure 5. Here there are no pages, the printed matter being continuous, and numbers 55 being placed at desired intervals along one or both sides of the film so that any desired place can be readily found.

While a preferred embodiment of the device has been disclosed herein by way of illustration, it will be understood that many changes in the details of construction can be made by those skilled in the art based on the inventive concept herein disclosed and defined in the appended claims without limitation as to such details.

What is claimed is:

1. Microfilm reading spectacles adapted to be worn by the user including a casing adapted to rest against the user's nose and including means for securing said casing to the user's head, a binocular optical system including spaced-apart lenses in said casing, said lenses being focussed on a single view whereby either eye of the user sees the same field, said casing having interpupillary spaced eyepieces overlying said lenses, a film gate on said casing including a fixed member and a movable member overlying said fixed member, said members being adapted to position a film with its surface in a plane parallel to the axis of said lenses and in the said field of view on which said lenses are focussed, means in said casing for directing light passing through said film in a path perpendicular to the plane of the film, and into said lenses and eyepieces, and means for supporting a film on said casing to be traversed through said gate in a direction parallel to the optical axis of said lenses and eyepieces including a well in said casing and a support extending outwardly therefrom.

2. Microfilm reading spectacles adapted to be worn by the user including a casing adapted to rest against the user's nose and including means for securing said casing to the user's head, said casing forming a chamber having a front wall, a film gate comprising a fixed member and a movable member overlying said fixed member, said members being positioned on the upper edge of said wall and defining therewith an aperture, interpupillary spaced eye flanges formed in the wall of said casing opposite said first wall, a binocular optical system in said chamber having its front focal focus at the plane occupied by film in said aperture, means including pins projecting from the outer surface of said first wall for supporting film reels and to support a film extending therebetween and through said gate with the path of travel of the film in said gate in a plane transverse the axis of said flanges, and means spaced apart from said pins and including a movable pin projecting from said casing and a well within said casing for supporting a pair of film reels on the casing to support a film extending therebetween and through said gate with the path of travel of said film in said gate in a plane parallel to the axis of said flanges.

VERNEUR E. PRATT.
GEORGE F. GRAY.

REFERENCES CITED

The following references are of record in the file of this patent:

UNITED STATES PATENTS

| Number | Name | Date |
| --- | --- | --- |
| 764,788 | Armat | July 12, 1904 |
| 1,198,600 | Sudmann | Sept. 19, 1916 |
| 1,476,290 | Fiske | Dec. 4, 1923 |
| 1,564,722 | Tauern et al. | Dec. 8, 1925 |
| 1,818,757 | Samson et al. | Aug. 11, 1931 |
| 2,005,014 | Tondreau | June 18, 1935 |
| 2,239,032 | Boch | Apr. 22, 1941 |
| 2,337,567 | North | Dec. 28, 1943 |
| 2,372,192 | Fassel | Mar. 27, 1945 |
| 2,407,009 | Holbrook | Sept. 3, 1946 |

FOREIGN PATENTS

| Number | Country | Date |
| --- | --- | --- |
| 79,867 | Austria | Jan. 26, 1920 |
| 418,761 | Germany | Sept. 18, 1925 |